US011753562B2

(12) United States Patent
Grötzinger et al.

(10) Patent No.: US 11,753,562 B2
(45) Date of Patent: Sep. 12, 2023

(54) EPOXY RESIN COMPOSITION FOR COATING PURPOSES

(71) Applicant: SIKA TECHNOLOGY AG, Baar (CH)

(72) Inventors: Jochen Grötzinger, Schwäbisch Gmünd (DE); Uwe Von Der Brüggen, Meckesheim (DE); Johannes Viertel, Vaihingen (DE); Edis Kasemi, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/956,164

(22) PCT Filed: Dec. 18, 2018

(86) PCT No.: PCT/EP2018/085496
§ 371 (c)(1),
(2) Date: Jun. 19, 2020

(87) PCT Pub. No.: WO2019/134821
PCT Pub. Date: Jul. 11, 2019

(65) Prior Publication Data
US 2020/0354604 A1    Nov. 12, 2020

(30) Foreign Application Priority Data

Jan. 3, 2018 (EP) ..................... 18150158

(51) Int. Cl.
| | |
|---|---|
| *C09D 163/00* | (2006.01) |
| *C09D 7/65* | (2018.01) |
| *C09D 7/20* | (2018.01) |
| *C08G 59/50* | (2006.01) |
| *C08K 5/01* | (2006.01) |
| *C08K 5/101* | (2006.01) |

(52) U.S. Cl.
CPC ....... *C09D 163/00* (2013.01); *C08G 59/5026* (2013.01); *C08K 5/101* (2013.01); *C09D 7/20* (2018.01); *C09D 7/65* (2018.01); *C08K 5/01* (2013.01)

(58) Field of Classification Search
CPC ...... C08L 63/00–10; C09D 163/00–10; C09D 7/65; C09D 191/00; C08K 5/01; C08K 5/10; C08K 5/101; C09G 59/5026
See application file for complete search history.

(56) References Cited

U.S. PATENT DOCUMENTS

| | | | |
|---|---|---|---|
| 3,506,603 A | 4/1970 | Baker et al. | |
| 6,416,620 B1 * | 7/2002 | Narancic | D21C 5/02 162/5 |
| 2007/0066721 A1 * | 3/2007 | Kramer | C08G 18/10 523/400 |
| 2009/0036582 A1 * | 2/2009 | Muller-Frischinger | C08G 59/184 524/291 |
| 2012/0142816 A1 * | 6/2012 | Argyropoulos | C09D 163/00 523/400 |
| 2015/0337076 A1 | 11/2015 | Kasemi et al. | |
| 2017/0183444 A1 | 6/2017 | Kasemi et al. | |
| 2017/0369633 A1 * | 12/2017 | Caruso Dailey | C08G 59/188 |

FOREIGN PATENT DOCUMENTS

| | | |
|---|---|---|
| CN | 1120051 A | 4/1996 |
| CN | 101374879 A | 2/2009 |
| CN | 104884496 A | 9/2015 |
| EP | 2752437 A1 | 7/2014 |

OTHER PUBLICATIONS

Huntsman, Modifier DW 1765 Data Sheet (Year: 2012).*
Huntsman, Advanced Materials: High Performance Components (2010).*
Jul. 7, 2020 International Preliminary Report on Patentability issued in International Patent Application No. PCT/EP2018/085496.
Jan. 29, 2019 International Search Report issued in International Patent Application No. PCT/EP2018/085496.

* cited by examiner

*Primary Examiner* — Kregg T Brooks
(74) *Attorney, Agent, or Firm* — Oliff PLC

(57) ABSTRACT

The invention relates to an epoxy resin composition comprising at least one epoxy liquid resin, bis(aminomethyl) cyclohexane and a wax. The claimed composition can be processed in an excellent manner, cures very rapidly and virtually no yellowing occurs, has a hard, glossy surface of high quality, even during curing under moist conditions such as, for example, 8° C. and 80% relative humidity. The claimed composition is particularly suitable for use as a floor coating, in particular as a top coat or sealing, where low emission together with high demands on the workability, impact strength and the aesthetics exist.

15 Claims, No Drawings

EPOXY RESIN COMPOSITION FOR COATING PURPOSES

TECHNICAL FIELD

The invention relates to the field of low-temperature curing epoxy resin compositions, and also coatings, for floors in particular.

PRIOR ART

Coating products based on epoxy resins are widely used in the building trade. They consist of liquid resin and curing components, which are mixed before application and then react at ambient temperatures in the range from approx. 5 to 35° C. to form a solid coating. Since the curing component contains amines as the principal reactive constituent, such products have a tendency to surface defects such as cloudiness, spotting, roughness or tackiness when cured, which is also referred to as "blushing". Blushing is caused by the amines forming a salt with carbon dioxide ($CO_2$) from the air and occurs particularly at high humidity and low temperatures. Especially in aesthetically demanding coating applications such as floor coatings, the occurrence of blushing-related surface defects is extremely disadvantageous and usually necessitates laborious reworking or over-coating of the damaged areas or often even of the entire coating.

The viscosity of an epoxy resin composition is reduced using thinners so that it is easy to apply. At the same time, thinners also reduce the susceptibility to blushing. The customary thinners, such as benzyl alcohol, are volatile compounds (VOC or SVOC) that are not incorporated into the resin matrix during curing and thus result in emissions. For low-emission products, for which there is a growing demand from consumers, this means that thinners may be used only in small amounts or not at all.

Accelerators such as phenols or Mannich bases result in more rapid curing at lower temperatures allied with reduced susceptibility to blushing. However, such accelerators have strong odors, are not toxicologically harmless, and reduce the lightfastness of the coating by increasing yellowing. Acids such as salicylic acid or p-toluenesulfonic acid can also be used as accelerators. However, these increase the viscosity substantially and sometimes also lead to increased yellowing.

To reduce blushing and for thinning purposes, it is also possible to use specific amines, for example alkylated polyamines. These are, however, costly and often result in slower curing under cold conditions.

Blushing can also be reduced by using hydrophobic additives, for example waxes, which float on the coating and shield it from contact with atmospheric moisture. However, the effect of such additives is often inadequate and strongly dependent on the composition of the coating.

SUMMARY OF THE INVENTION

It is therefore an object of the present invention to provide an epoxy resin composition suitable for coating purposes that is low in emissions, cures rapidly and without blushing-related surface defects even in damp, cold conditions, and results in mechanically high-quality coatings having a defect-free surface and a low tendency to yellowing.

This object is achieved by the epoxy resin composition as described in claim 1. It comprises a combination of wax and bis(aminomethyl)cyclohexane.

Surprisingly, this combination permits very rapid-curing coatings having defect-free surfaces, even when curing under cold conditions. The very low viscosity of the composition of the invention gives it outstanding processability. It achieves this using only a small amount of a thinner such as benzyl alcohol or none at all and accordingly gives rise to extremely low emissions or none at all. The cured coating has outstanding mechanical strength and shows an extremely low tendency to yellowing.

A particular surprise, and something that is not observed with similar compositions based on other amines, is that the presence of the wax not only improves coating quality, but also results in appreciably better stability in respect of yellowing.

When other amines customary in the prior art, such as 1-amino-3-aminomethyl-3,5,5-trimethylcyclohexane (IPDA), 1,3-bis(aminomethyl)benzene (MXDA), 2,2(4),4-trimethylhexamethylenediamine (TMD), triethylene tetramine (TETA), tetraethylenepentamine (TEPA) or polyoxypropylenediamine, are used instead of bis(aminomethyl) cyclohexane, the corresponding epoxy resin compositions have appreciably poorer properties, even when they include a wax. For use as floor coatings, these would need to be improved through the addition of adducts and/or other additives, but experience has shown that this adversely affects other properties such as processability, odor, emissions or tendency to yellowing. Although IPDA, MXDA, TMD or TETA in combination with the wax show improvements in surface quality, blushing-related defects still occur, while polyoxypropylenediamine cures undesirably slowly.

The epoxy resin composition of the invention makes possible coating products that have excellent processability, cure very rapidly, show practically no yellowing, and have a hard, glossy surface of high quality, even when used under cold, damp conditions such as 8° C. and 80% relative humidity. These products are consequently particularly suitable as a floor coating, especially as a topcoat or seal, when low emissions alongside high demands on processability and esthetics are important.

Further aspects of the invention are the subject of further independent claims. Particularly preferred embodiments of the invention are the subject of the dependent claims.

Ways of Executing the Invention

The invention relates to an epoxy resin composition comprising at least one liquid epoxy resin, bis(aminomethyl) cyclohexane, and at least one wax.

"Liquid epoxy resin" refers to an industrial polyepoxide having a glass transition temperature below 25° C.

"Wax" refers to a hydrophobic mass that is immiscible with water, is solid but kneadable at room temperature, and melts without decomposition at a temperature above 40° C., in particular above 50° C., to a liquid of relatively low viscosity.

A "primary amino group" refers to an amino group that is attached to a single organic radical and bears two hydrogen atoms; a "secondary amino group" refers to an amino group that is attached to two organic radicals that may also together be part of a ring and bears one hydrogen atom; and a "tertiary amino group" refers to an amino group that is attached to three organic radicals, two or three of which may also be part of one or more rings, and does not bear any hydrogen atom.

"Amine hydrogen" refers to the hydrogen atoms of primary and secondary amino groups.

"Amine hydrogen equivalent weight" refers to the mass of an amine or an amine-containing composition that contains one molar equivalent of amine hydrogen.

Substance names beginning with "poly", such as polyamine, polyol or polyepoxide, refer to substances that formally contain two or more of the functional groups that occur in their name per molecule.

A "thinner" refers to a substance that is soluble in an epoxy resin and lowers its viscosity, and that is not chemically incorporated into the epoxy polymer during the curing process.

"Viscosity" refers to the dynamic viscosity or shear viscosity, which is defined by the ratio between the shear stress and the shear rate (speed gradient) and is determined as described in the description or the working examples.

"Molecular weight" refers to the molar mass (in g/mol) of a molecule. "Average molecular weight" refers to the number-average molecular weight $M_n$ of a polydisperse mixture of oligomeric or polymeric molecules, which is typically determined by gel-permeation chromatography (GPC) against polystyrene as standard.

"Room temperature" refers to a temperature of 23° C.

A suitable liquid epoxy resin is obtained in a known manner, in particular from the oxidation of the corresponding olefins or from the reaction of epichlorohydrin with the corresponding polyols, polyphenols or amines.

Suitable liquid epoxy resins are in particular aromatic epoxy resins, especially the glycidyl ethers of:
  bisphenol A, bisphenol F or bisphenol A/F, where A stands for acetone and F for formaldehyde, which served as reactants for the preparation of these bisphenols. In the case of bisphenol F, positional isomers may also be present, especially derived from 2,4'- or 2,2'-hydroxyphenylmethane.
  dihydroxybenzene derivatives such as resorcinol, hydroquinone or catechol;
  further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;
  condensation products of phenols with formaldehyde that are obtained under acidic conditions, such as phenol novolaks or cresol novolaks, also called bisphenol F novolaks;
  aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable liquid epoxy resins are aliphatic or cycloaliphatic polyepoxides, especially
  glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;
  a hydrogenated bisphenol A, F or A/F liquid resin, or the glycidylation products of hydrogenated bisphenol A, F or A/F;
  an N-glycidyl derivative of amides or heterocyclic nitrogen bases, such as triglycidyl cyanurate or triglycidyl isocyanurate, or reaction products of epichlorohydrin with hydantoin.
  epoxy resins from the oxidation of olefins such as, in particular, vinylcyclohexene, dicyclopentadiene, cyclohexadiene, cyclododecadiene, cyclododecatriene, isoprene, 1,5-hexadiene, butadiene, polybutadiene or divinylbenzene.

A preferred liquid epoxy resin is a liquid resin based on a bisphenol, in particular a bisphenol A diglycidyl ether and/or bisphenol F diglycidyl ether, as are commercially available, for example, from Dow, Huntsman or Momentive. These liquid resins have a viscosity that is low for epoxy resins and good properties as a coating when cured. They may contain proportions of solid bisphenol A resin or novolak glycidyl ethers.

Suitable as the bis(aminomethyl)cyclohexane is 1,2-bis(aminomethyl)cyclohexane or 1,3-bis(aminomethyl)cyclohexane or 1,4-bis(aminomethyl)cyclohexane or mixtures thereof.

Preference is given to 1,3-bis(aminomethyl)cyclohexane or 1,4-bis(aminomethyl)cyclohexane or mixtures thereof.

Particular preference is given to 1,3-bis(aminomethyl)cyclohexane. This is prepared in particular from 1,3-bis(aminomethyl)benzene (MXDA) by hydrogenation and is commercially available, for example, from Mitsubishi Gas Chemical.

The wax is in particular a natural wax such as beeswax or montan wax, a wax obtained by hardening of vegetable oil through hydrogenation, such as soy wax, rapeseed wax or castor wax, a wax obtained from mineral oil such as, in particular, a paraffin wax, a synthetic wax such as, in particular, a polyethylene wax, an amide wax (ethylene distearylamide), or a mixture of such waxes.

The wax is preferably selected from the group consisting of beeswax, montan wax, soy wax, rapeseed wax, castor wax, paraffin wax, polyethylene wax, ethylene distearylamide, and mixtures of these waxes.

The wax preferably contains long-chain fatty acid esters and/or long-chain hydrocarbons, preferably having a molecular weight in the range from 250 to 1000 g/mol, in particular 250 to 500 g/mol.

The wax is particularly preferably a paraffin wax, in particular a paraffin wax comprising linear or branched saturated hydrocarbons having a molecular weight in the range from 250 to 500 g/mol.

The wax is preferably in the form of a dispersion in a non-aqueous medium.

The non-aqueous medium is liquid, especially at room temperature.

The non-aqueous medium is preferably of low volatility and has a boiling point of at least 250° C. and a vapor pressure of not more than 0.01 kPa at a temperature of 20° C.

Such a wax dispersion is preferably stable when stored at room temperature.

The non-aqueous medium preferably has good compatibility with epoxy resin compositions based on bisphenol A or F diglycidyl ethers.

The non-aqueous medium itself preferably contains epoxy groups. This means it is incorporated during curing of the composition and does not give rise to emissions or migration.

Preference as the non-aqueous medium is given to a compound selected from the group consisting of bisphenol A diglycidyl ether, bisphenol F diglycidyl ether, bisphenol A/F diglycidyl ether, dipropylene glycol diglycidyl ether, tripropylene glycol diglycidyl ether, diglycidyl ethers of polypropylene glycols, butane-1,4-diol diglycidyl ether, hexane-1,6-diol diglycidyl ether, dimethylolcyclohexane diglycidyl ether, cresyl glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, 2-ethylhexyl glycidyl ether, glycidyl ethers of natural alcohols, in particular $C_8$- to $C_{10}$-alkyl, $C_{12}$- to $C_{14}$-alkyl or $C_{13}$- to $C_{15}$-alkyl glycidyl ethers, and combinations of the recited compounds.

Particular preference as the non-aqueous medium is given to a mixture of bisphenol A, F or A/F diglycidyl ethers and alkyl glycidyl ethers of natural alcohols, in particular $C_8$- to $C_{10}$-alkyl, $C_{12}$- to $C_{14}$-alkyl or $C_{13}$- to $C_{15}$-alkyl glycidyl ethers.

The wax is preferably a paraffin wax in the form of a dispersion in a mixture of bisphenol A, F or A/F diglycidyl ethers, in particular $C_8$- to $C_{10}$-alkyl, $C_{12}$- to $C_{14}$-alkyl or $C_{13}$- to $C_{15}$-alkyl glycidyl ethers.

A wax dispersion of this kind preferably contains 40% to 75% by weight of paraffin wax, 10% to 30% by weight of bisphenol A, F or A/F diglycidyl ethers, and 10% to 30% by weight of alkyl glycidyl ethers.

In addition, a wax dispersion of this kind may contain further auxiliaries and additives, in particular emulsifiers, stabilizers or thickeners.

The wax dispersed in the non-aqueous medium preferably has a particle size in the range from 1 to 500 μm, in particular 10 to 100 μm. The average particle size is preferably in the range from 20 to 60 μm.

The preferred embodiments of the wax have particularly good miscibility in a liquid epoxy resin, in which they remain stable when stored at room temperature, and are particularly effective at promoting the formation of a defect-free surface when the epoxy resin composition is used as a surface coating.

The epoxy resin composition preferably contains 0.1 to 10, more preferably 0.2 to 5, in particular 0.2 to 2, parts by weight of wax based on 100 parts by weight of epoxy group-containing constituents of the composition.

The epoxy resin composition may additionally comprise further constituents.

It preferably comprises at least one further constituent selected from reactive diluents containing epoxy groups, further polyamines, accelerators, thinners, and fillers.

Preferred reactive diluents containing epoxy groups are in particular glycidyl ethers of mono- or polyhydric phenols or aliphatic or cycloaliphatic alcohols, such as, in particular, the glycidyl ethers of dihydric or polyhydric alcohols already mentioned, or monoglycidyl ethers such as, in particular, phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as, in particular, $C_8$- to $C_{10}$-alkyl or $C_{12}$- to $C_{14}$-alkyl or $C_{13}$- to $C_{15}$-alkyl glycidyl ethers. The addition of a reactive diluent containing epoxy groups causes a reduction in viscosity and/or glass transition temperature and/or mechanical values.

Suitable other polyamines are in particular aliphatic, cycloaliphatic or arylaliphatic primary diamines or triamines, in particular 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2(4)-methyl-1,3-diaminocyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA) or 1,4-bis(aminomethyl)benzene;

aliphatic primary di- or triamines containing ether groups, in particular bis(2-aminoethyl) ether, 3,6-dioxaoctane-1,8-diamine, 4,7-dioxadecane-1,10-diamine, 4,7-dioxadecane 2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, cycloaliphatic diamines containing ether groups from the propoxylation and subsequent amination of 1,4-dimethylolcyclohexane, available in particular as Jeffamine® particular RFD-270 (from Huntsman), or polyoxyalkylenediamine or polyoxyalkylenetriamine, in particular Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000 (all from Huntsman), or corresponding amines from BASF or Nitroil;

polyamines having secondary amino groups such as, in particular, 2-aminoethylpiperazine, 3-dimethylaminopropylamine (DMAPA), 3-(3-(dimethylamino)propylamino)propylamine (DMAPAPA), bis(hexamethylene)triamine (BHMT), diethylenetriamine (DETA), triethylenetetramine (TETA), tetraethylenepentamine (TEPA), pentaethylenehexamine (PEHA) or higher homologs of linear polyethylenamines, dipropylenetriamine (DPTA), N-(2-aminoethyl)-propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine, N,N'-bis(3-amino-1-ethylpropyl)-2-methylpentane-1,5-diamine, products of the reactive alkylation of primary polyamines with aldehydes or ketones, in particular N-benzylethane-1,2-diamine, N,N'-dibenzylethane-1,2-diamine, N-benzylpropane-1,2-diamine, N-benzyl-1,3-bis(aminomethyl)benzene, N,N'-dibenzyl-1,3-bis(aminomethyl)benzene, N-2-ethylhexyl-1,3-bis(aminomethyl)benzene, N,N'-bis(2-ethylhexyl)-1,3-bis(aminomethyl)benzene, N-benzyldiethylenetriamine, N,N'-dibenzyldiethylenetriamine, N-benzyltriethylenetetramine, N,N'-dibenzyltriethylenetetramine, N'''-benzyl-N,N'-bis(3-aminopropyl)ethylenediamine, N''',N''''-dibenzyl-N,N'-bis(3-aminopropyl)ethylenediamine, or partially styrenized polyamines, for example styrenized MXDA containing N-phenylethyl-1,3-bis(aminomethyl)benzene (available as Gaskamine® 240 from Mitsubishi Gas Chemical);

adducts of bis (aminomethyl)cyclohexane or of the above-mentioned polyamines or of other polyamines with epoxides or epoxy resins, in particular adducts with diepoxides or monoepoxides;

polyamidoamines, in particular reaction products of a mono- or polybasic carboxylic acid, or of esters or anhydrides thereof, in particular a dimerized fatty acid, with an aliphatic, cycloaliphatic or aromatic polyamine used in stoichiometric excess, in particular a polyalkylene amine such as DETA or TETA; or Mannich bases, especially phenalkamines, i.e. reaction products of phenols, in particular cardanol, with aldehydes, in particular formaldehyde, and polyamines.

Preferred further polyamines are selected from the group consisting of TMD, 1,2-, 1,3- or 1,4-diaminocyclohexane, bis(4-aminocyclohexyl)methane, IPDA, 2(4)-methyl-1,3-diaminocyclohexane, MXDA, 1,4-bis(aminomethyl)benzene, polyoxypropylenediamines having an average molecular weight in the range from 200 to 500 g/mol, N-benzylethane-1,2-diamine, N,N'-dibenzylethane-1,2-diamine, N-benzylpropane-1,2-diamine, N-benzyl-1,3-bis(aminomethyl)benzene, N,N'-dibenzyl-1,3-bis(aminomethyl)benzene, N'''-benzyl-N,N'-bis(3-aminopropyl)ethylenediamine, N''',N''''-dibenzyl-N,N'-bis(3-aminopropyl)ethylenediamine, and adducts of these or other polyamines with mono- or diepoxides.

In a preferred embodiment, the epoxy resin composition includes N-benzylethane-1,2-diamine as a further polyamine, optionally in combination with N,N'-dibenzylethane-1,2-diamine. The content of N-benzylethane-1,2-diamine, based on the sum of the amines, is preferably in the range from 1% to 50% by weight, preferably 2% to 30% by weight, in particular 5% to 25% by weight. A composition of this kind permits coatings having particularly high impact resistance.

Suitable accelerators are substances that accelerate the reaction between amino groups and epoxy groups, in particular acids or compounds hydrolyzable to acids, in particular organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids such as, in particular, phosphoric acid, or mixtures of the abovementioned acids or acid esters; tertiary amines such as, in particular, 1,4-diazabicyclo[2.2.2]octane, benzyldimethylamine, α-methylbenzyldimethylamine, triethanolamine, N,N-dimethylaminopropylamine, imidazoles such as, in particular, N-methylim idazole, N-vinylimidazole or 1,2-dimethylimidazole, salts of such tertiary amines, quaternary ammonium salts, in particular benzyltrimethylammonium chloride, amidines such as, in particular, 1,8-diazabicyclo[5.4.0]undec-7-ene, guanidines such as, in particular, 1,1,3,3-tetramethylguanidine, phenols such as, in particular, bisphenols, phenolic resins or Mannich bases, in particular, 2-(dimethylaminomethyl)phenol, 2,4,6-tris(dimethylaminomethyl)phenol or polymers obtained from phenol, formaldehyde and N,N-dimethylpropane-1,3-diamine, phosphites, in particular di- or triphenyl phosphites, nitrites such as, in particular, calcium nitrite, or compounds having mercapto groups.

Preference is given to acids, tertiary amines, nitrates or Mannich bases.

Particular preference is given to salicylic acid, 2,4,6-tris(dimethylaminomethyl)phenol or calcium nitrate a combination thereof.

Suitable thinners are, in particular, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butylyl ether, propylene glycol butyl ether, propylene glycol phenyl ether, dipropylene glycol, dipropylene glycol monomethyl ether, dipropylene glycol dimethyl ether, dipropylene glycol di-n-butyl ether, diphenylmethane, diisopropylnaphthalene, mineral oil fractions, for example Solvesso® products (from Exxon), alkylphenols such as tert-butylphenol, nonylphenol, dodecylphenol, cardanol (from cashew nut shell oil, containing as the main constituent 3-(8,11,14-pentadecatrienyl) phenol), styrenized phenol, bisphenols, aromatic hydrocarbon resins, in particular types containing phenol groups, alkoxylated phenol, in particular ethoxylated or propoxylated phenol, in particular 2-phenoxyethanol, adipates, sebacates, phthalates, benzoates, organic phosphoric or sulfonic esters or sulfonamides.

Preferred thinners are benzyl alcohol, 2-phenoxyethanol, cardanol, styrenized phenol, diisopropylnaphthalene or aromatic hydrocarbon resins containing phenol groups. Particular preference is given to benzyl alcohol, diisopropylnaphthalene or cardanol, in particular benzyl alcohol.

The content of thinners in the epoxy resin composition is preferably in the range from 0% to 20% by weight, more preferably 0% to 15% by weight, in particular 0% to 10% by weight. Such compositions have particularly low emissions.

In a preferred embodiment, the epoxy resin composition comprises 1% to 15% by weight, in particular 2% to 10% by weight, of thinner, in particular benzyl alcohol. A composition of this kind permits low-emission coatings that have high impact resistance and hardness.

Suitable fillers are, in particular, ground or precipitated calcium carbonate, which are optionally coated with fatty acid, in particular stearates, baryte (heavy spar), talc, quartz powder, quartz sand, silicon carbide, iron mica, dolomite, wollastonite, kaolin, mica (potassium aluminum silicate), molecular sieve, aluminum oxide, aluminum hydroxide, magnesium hydroxide, silica, cement, gypsum, fly ash, carbon black, graphite, metal powders such as aluminum, copper, iron, zinc, silver or steel, PVC powder or hollow beads.

Preference is given to calcium carbonate, quartz powder, and quartz sand.

The epoxy resin composition may optionally comprise further auxiliaries and additives, in particular the following:

reactive diluents, in particular those already mentioned, or epoxidized soybean oil or linseed oil, compounds containing acetoacetate groups, in particular acetoacetylated polyols, butyrolactone, carbonates, aldehydes, isocyanates or silicones having reactive groups;

further amines, in particular monoamines such as, in particular, benzylamine or furfurylamine or aromatic polyamines such as, in particular, 4,4'-, 2,4' and/or 2,2'-diaminodiphenylmethane, 2,4- and/or 2,6-tolylenediamine, 3,5-dimethylthio-2,4-tolylenediamine and/or 3,5-dimethylthio-2,6-tolylenediamine, 3,5-diethyl-2,4-tolylenediamine and/or 3,5-diethyl-2,6-tolylenediamine;

compounds having mercapto groups, in particular liquid mercaptan-terminated polysulfide polymers, mercaptan-terminated polyoxyalkylene ethers, mercaptan-terminated polyoxyalkylene derivatives, polyesters of thiocarboxylic acids, 2,4,6-trimercapto-1,3,5-triazine, triethylene glycol dimercaptan or ethanedithiol;

polymers, in particular polyamides, polysulfides, polyvinyl formal (PVF), polyvinyl butyral (PVB), polyurethanes (PUR), polymers having carboxyl groups, polyam ides, butadiene-acrylonitrile copolymers, styrene-acrylonitrile copolymers, butadiene-styrene copolymers, homo- or copolymers of unsaturated monomers, in particular from the group comprising ethylene, propylene, butylene, isobutylene, isoprene, vinyl acetate or alkyl (meth)acrylates, in particular chlorosulfonated polyethylenes or fluorine-containing polymers or sulfonamide-modified melamines;

fibers, in particular glass fibers, carbon fibers, metal fibers, ceramic fibers or polymer fibers such as polyamide fibers or polyethylene fibers;

pigments, in particular titanium dioxide, iron oxides or chromium(III) oxide;

rheology modifiers, in particular thickeners or antisettling agents;

adhesion improvers, in particular organoalkoxysilanes;

flame-retardant substances, in particular the aluminum hydroxide or magnesium hydroxide fillers already mentioned, antimony trioxide, antimony pentoxide, boric acid $(B(OH)_3)$, zinc borate, zinc phosphate, melamine borate, melamine cyanurate, ammonium polyphosphate, melamine phosphate, melamine pyrophosphate, polybrominated diphenyl oxides or diphenyl ethers, phosphates such as, in particular, diphenyl cresyl phosphate, resorcinol bis(diphenylphosphate), resorcinol diphosphate oligomer, tetraphenylresorcinol diphosphite, ethylenediamine diphosphate, bisphenol A bis(diphenylphosphate), tris(chloroethyl) phosphate, tris(chloropropyl) phosphate, tris(dichloroisopropyl) phosphate, tris[3-bromo-2,2-bis(bromomethyl)propyl] phosphate, tetrabromobisphenol A, bis(2,3-dibromopropyl ether) of bisphenol A, brominated epoxy resins, ethylenebis(tetrabromophthalim ide), ethylenebis(dibromonorbornanedicarboximide), 1,2-bis(tribromophenoxy)ethane, tris(2,3-dibromopropyl) isocyanurate, tribromophenol, hexabromocyclododecane, bis(hexachlorocyclopentadieno)cyclooctane or chloroparaffins; or additives, in particular wetting agents, leveling agents, defoamers, deaerators, stabilizers against oxidation, heat, light or UV radiation, or biocides.

If the epoxy resin composition contains other polyamines in addition to bis(aminomethyl)cyclohexane, the content of bis(aminomethyl)cyclohexane based on the sum of the amines is preferably at least 35% by weight, more preferably at least 50% by weight, in particular at least 70% by weight, most preferably at least 85% by weight. In an epoxy resin composition of this kind, the described preferred properties are particularly pronounced.

The epoxy resin composition is preferably largely free of amines having a molecular weight below 120 g/mol, in particular below 150 g/mol. It preferably contains, based on the sum of the amines, less than 2% by weight, in particular less than 1% by weight, of amines having a molecular weight below 120 g/mol, in particular below 150 g/mol.

A composition of this kind is particularly advantageous as regards toxicology and odor and permits particularly attractive surfaces.

The epoxy resin composition preferably contains only a low content of amine-epoxy adducts. It preferably contains, based on the sum of the amines, less than 30% by weight, more preferably less than 20% by weight, in particular less than 10% by weight, of amine-epoxy adducts. A composition of this kind has particularly low viscosity even without a thinner.

The epoxy resin composition preferably contains only a low content of high-boiling thinners. It preferably contains less than 30% by weight, more preferably less than 20% by weight, in particular less than 15% by weight, most preferably less than 10% by weight, of thinners having a boiling point of at least 200° C.

The epoxy resin composition preferably contains less than 5% by weight, more preferably less than 2% by weight, in particular less than 1% by weight, and most preferably has no content at all, of thinners having a boiling point below 200° C. A composition of this kind is particularly low in emissions.

In the epoxy resin composition, the ratio of the number of groups reactive toward epoxy groups relative to the number of epoxy groups is preferably in the range from 0.5 to 1.5, in particular 0.7 to 1.2.

The amine hydrogens present in the epoxy resin composition and any other groups present that are reactive toward epoxy groups react with the epoxy groups, with ring opening (addition reaction) thereof. As a result primarily of this reaction, the composition polymerizes and thereby cures.

The epoxy resin composition is preferably in the form of a composition having two or more components and includes
a resin component that comprises at least one liquid epoxy resin and optionally further compounds having epoxy groups, and
a curing agent component that comprises bis(aminomethyl)cyclohexane and optionally further polyamines or curing agents,
wherein the wax is present as a constituent of the resin component or of the curing agent component or of both components.

Other constituents contained in the epoxy resin composition, such as thinners, accelerators, fillers or additives such as wetting agents or deaerators, may be present in the resin component or the curing agent component or in both components.

If the wax is in the form of a dispersion in a non-aqueous medium that itself has epoxy groups, it is preferably a constituent of the resin component.

The resin component and the curing agent component of the epoxy resin composition are each stored in a separate container. Other constituents of the epoxy resin composition may be present as a constituent of the resin component or of the curing agent component. It is likewise possible for further constituents to be present as a dedicated, separate component.

The components are storable, meaning that they can be stored prior to use for several months up to one year or longer without any change in their respective properties to a degree relevant to their use.

For the use of the epoxy resin composition, the components are mixed with one another shortly before or during application.

The components are mixed by means of a suitable method; this mixing may be done continuously or batchwise. Mixing is carried out in particular at ambient temperature, which is typically in the range from 5 to 50° C., preferably 10 to 30° C.

On mixing the two components, curing commences through a chemical reaction. This involves reaction of the amine hydrogens present in the epoxy resin composition and of any further groups present that are reactive toward epoxy groups with the epoxy groups, as described above.

Curing typically takes place at a temperature in the range from 0 to 50° C. It is preferably carried out at ambient temperature, in particular at 5 to 40° C., preferably 10 to 30° C., and typically extends over a period of a few days to weeks. The duration depends upon factors including the temperature, the reactivity of the constituents, and the stoichiometry thereof, and on the presence of accelerators.

The invention thus further provides a cured composition obtained from the curing of the epoxy resin composition as described in the present document.

The epoxy resin composition is applied to at least one substrate, the following substrates being particularly suitable:

- glass, glass ceramic, concrete, mortar, brick, tile, plaster, asphalt, and natural rocks such as granite or marble;
- metals or alloys such as aluminum, iron, steel or nonferrous metals, or surface-finished metals or alloys such as galvanized or chromed metals;
- leather, textiles, paper, wood, woodbase materials bonded with resins, e.g. phenolic, melamine or epoxy resins, resin-textile composites or further so-called polymer composites;
- plastics, in particular rigid or flexible PVC, ABS, polycarbonate (PC), polyamide (PA), polyesters, PMMA, epoxy resins, PUR, POM, PO, PE, PP, EPM or EPDM, where the surface of the plastics has optionally undergone plasma-, corona- or flame-treatment;
- fiber-reinforced plastics such as carbon fiber-reinforced plastics (CRP), glass fiber-reinforced plastics (GRP) or sheet molding compounds (SMC);
- coated substrates such as powder-coated metals or alloys;
- paints or varnishes.

The substrates may be pretreated if required prior to the application of the epoxy resin composition.

The described epoxy resin composition is advantageously usable as a covering, coating, paint, varnish, seal, basecoat or primer for construction and industrial applications, especially as a floor covering or floor coating for interiors such as offices, industrial halls, gyms or cold-storage areas, or outdoors for balconies, terraces, parking decks, bridges or roofs, as a protective coating for concrete, cement, metals, plastics or wood, for example for surface sealing of wood constructions, vehicles, loading areas, tanks, silos, shafts, pipelines, machines or steel constructions, for example of ships, piers, offshore platforms, lock gates, hydroelectric power plants, river constructions, swimming pools, wind turbines, bridges, chimneys, cranes or sheet-pile walls, or as an undercoat, tiecoat or for hydrophobization of surfaces.

The described epoxy resin composition is preferably used as a floor coating, especially in interiors such as offices, industrial halls, gyms or cold-storage areas, or outdoors for balconies, terraces, parking decks or bridges. It is particularly preferably used as a topcoat or seal, where the surface quality is particularly important.

For use as a floor coating, the epoxy resin composition is applied especially as a self-leveling or slightly thixotropic coating to predominantly flat surfaces. For this, it preferably has a liquid consistency with low viscosity and good flow properties.

Immediately after the resin component and the curing agent component have been mixed, it preferably has a viscosity, measured at 20° C., in the range from 0.2 to 4 Pa·s, more preferably 0.3 to 2 Pa·s, in particular 0.3 to 1.5 Pa·s. The mixed composition is, within the processing time, applied to the surface of a substrate as a thin film having a layer thickness of typically about 50 µm to about 5 mm, typically at ambient temperature. It is applied especially by pouring onto the substrate to be coated and then spreading it evenly using, for example, a doctor blade or a notched trowel. It may also be applied with a brush or roller or in the form of a spray application.

The floor coating is in particular an element of a floor covering comprising
- optionally a basecoat,
- optionally a leveling layer,
- one or more layers of a base layer, also referred to as a wear layer, which is optionally sprinkled with quartz sand,
- and optionally a seal (topcoat).

The epoxy resin composition of the invention may here constitute the basecoat and/or the leveling layer and/or the base layer and/or the seal of the floor covering. Further layers that do not correspond to the epoxy resin composition of the invention may likewise be epoxy resin compositions or another material, especially a polyurethane or polyurea coating.

As a basecoat, the epoxy resin composition of the invention may be largely free of fillers. A basecoat is applied to wet the surface, bind dust and dirt, close pores, and/or level the substrate. A basecoat is applied in an amount just covering to covering the substrate, especially concrete, mortar, plaster or asphalt.

As a leveling layer, the epoxy resin composition of the invention typically includes fillers. A leveling layer is applied to fill holes and indentations in a very uneven substrate, the end result being the provision of a largely level surface for applying the base layer.

As a base layer, the epoxy resin composition of the invention typically includes fillers. The base layer is preferably applied in a layer thickness in the range from 0.5 to 5 mm, optionally in two or more operations, with the final layer optionally sprinkled with quartz sand.

As a seal, the epoxy resin composition of the invention is preferably applied using a roller in a layer thickness in the range from 0.1 to 1 mm, in particular 0.2 to 0.5 mm. It may be used as a transparent seal largely without fillers or in filled and pigmented form.

With its advantageous properties as regards odor, processability, rapidity of curing, and robustness towards blushing-related defects, the epoxy resin composition of the invention is particularly suitable for all layers of a floor covering.

With the low emission values that can be achieved, the epoxy resin composition of the invention is particularly suitable for applications in the interior of buildings. With its outstanding lightfastness and stability against yellowing, the epoxy resin composition of the invention can be used especially preferably as a seal, also referred to as a topcoat, particularly as the final layer of a floor covering.

The use of the epoxy resin composition gives rise to an article.

The invention thus further provides an article comprising the cured composition that is obtained from the described use.

The epoxy resin composition of the invention has excellent processability, cures very rapidly, develops practically no yellowing, and provides a hard, glossy surface of high quality, even when cured under cold, damp conditions such as 8° C. and 80% relative humidity. These outstanding properties are in particular achieved even without the use of accelerators or thinners. The epoxy resin composition of the invention is particularly suitable for use as a floor coating, especially as a topcoat or seal, where low emissions alongside high demands on processability and esthetics are important.

EXAMPLES

Working examples are presented hereinbelow, which are intended to further elucidate the invention described. The invention is of course not limited to these described working examples.

"ANEW" stands for amine hydrogen equivalent weight.
"EEW" stands for epoxy equivalent weight.
"Standard climatic conditions" ("SCC") refers to a temperature of 23±1° C. and a relative air humidity of 50±5%.

Unless otherwise stated, the chemicals used were from Sigma-Aldrich Chemie GmbH.

Substances Used:
Modifier DW 1765 BD: Paraffin wax dispersed in bisphenol A diglycidyl ether and monoglycidyl ethers of $C_{12}$ to $C_{14}$ alcohols, EEW approx. 729 g/equiv. (from Huntsman)
Araldite® GY 250: Bisphenol A diglycidyl ether, EEW approx. 187.5 g/equiv. (from Huntsman)
Epikote® Resin 862: Bisphenol F diglycidyl ether, EEW approx. 169 g/equiv. (from Momentive)
Araldite® DY-E: Monoglycidyl ethers of $C_{12}$ to $C_{14}$ alcohols, EEW approx. 290 g/equiv. (from Huntsman)
1,3-BAC: 1,3-Bis(aminomethyl)cyclohexane, AHEW 35.5 g/equiv. (from Mitsubishi Gas Chemical)
IPDA 3-Aminomethyl-3,5,5-trimethylcyclohexylam ine, AHEW 42.6 g/equiv. (Vestamin® IPD from Evonik)
MXDA: 1,3-Bis(aminomethyl)benzene, AHEW 34 g/equiv. (from Mitsubishi Gas Chemical)
TMD: 2,2,4- and 2,4,4-Trimethylhexamethylenediamine, AHEW 39.6 g/equiv. (Vestamin® TMD, from Evonik)
TETA: Triethylenetetramine (TETA), AHEW approx. 27 g/equiv. (technical grade, from Huntsman).
D-230: Polyoxypropylenediamine having an average molecular weight of approx. 240 g/mol, AHEW 60 g/equiv. (Jeffamine® D-230, from Huntsman).
NB-EDA N-Benzylethane-1,2-diamine, AHEW 50.1 g
Production of Epoxy Resin Compositions:

Examples 1 to 12

For each example, the ingredients of the resin component indicated in table 1 were mixed in the indicated amounts (in parts by weight) by means of a centrifugal mixer (Speed-Mixer™ DAC 150, FlackTek Inc.) and stored with the exclusion of moisture.

The ingredients of the curing agent component indicated in table 1 were processed and stored in similar manner.

The two components of each composition were then processed by means of the centrifugal mixer to give a homogeneous liquid and this was tested immediately as follows:

The viscosity was measured 10 minutes after mixing ("Viscosity (10')") at 20° C. on a thermostated Rheotec RC30 cone-plate viscometer (cone diameter 50 mm, cone angle 1°, cone tip-plate distance 0.05 mm, shear rate 10 s$^{-1}$).

A first film coating was applied to a glass plate in a layer thickness of 500 μm, and this was stored/cured under standard climatic conditions. The König hardness (König pendulum hardness, measured in accordance with DIN EN ISO 1522) was determined on this film after 1 day ("König hardness (1 d SCC)"), after 2 days ("König hardness (2 d SCC)"), after 4 days ("König hardness (4 d SCC)"), after 7 days ("König hardness (7 d SCC)"), and after 14 days ("König hardness (14 d SCC)"). After 14 days, the appearance of the film was assessed (designated "Appearance (SCC)" in the table). A film was described as "nice" if it was clear and had a glossy and nontacky surface with no structure. "Structure" refers to any kind of marking or pattern on the surface.

A second film coating was applied to a glass plate in a layer thickness of 500 μm and immediately after application this was stored/cured for 7 days at 8° C. and 80% relative humidity and then for 2 weeks under standard climatic conditions. 24 hours after application, a polypropylene bottletop beneath which a small damp sponge had been positioned was placed onto the film. After a further 24 hours, the sponge and the lid were removed and positioned at a new point on the film, from which it was in turn removed and repositioned after 24 hours, this being done a total of 4 times. The appearance of this film was then assessed (designated "Appearance (8°/80%)" in the tables) in the same way as described for Appearance (SCC). Also reported in each case here was the number of visible marks that had formed in the film as a result of the damp sponge and/or the ring on top. The König hardness was again determined on the films thus cured, in each case after 7 days at 8° C. and 80% relative humidity ("König hardness (7 d 8°/80%)") and then after a further 2 days under SCC ("König hardness (+2 d SCC)"), 7 days under SCC ("König hardness (+7 d SCC)"), and 14 d under SCC ("König hardness (+14 d SCC)"). A white mark is a sign of blushing, caused by the damp sponge under the lid. A ring as a mark is caused by the lid on top, which leaves an imprint in the film, and is a sign of inadequate rapidity of curing of the composition.

As a measure of yellowing, the change in color after stressing in a weathering tester was determined. For this, a further coating was applied to a glass plate in a layer thickness of 500 μm and this was stored/cured under standard climatic conditions for 2 weeks and then stressed for 72 hours (Q-Sun (72 h)) at a temperature of 65° C. in a model Q-Sun Xenon Xe-1 weathering tester having a Q-SUN Daylight-Q optical filter and a xenon lamp having a light intensity of 0.51 W/m$^2$ at 340 nm. The color difference ΔE of the stressed film versus the corresponding unstressed film was then determined using an NH310 colorimeter from Shenzen 3NH Technology Co. LTD equipped with silicon photoelectric diode detector, light source A, color space measurement interface CIE L*a*b*C*H*. ΔE values from 0.5 to 2 represent minimal yellowing, 2 to 4 slight yellowing, 4 to 6 appreciable yellowing, and more than 6 strong yellowing.

The results are reported in table 1.

The examples labeled "(Ref.)" are comparative examples.

TABLE 1

Composition and properties of examples 1 to 12.

| Example | 1 | 2 (Ref.) | 3 (Ref.) | 4 (Ref.) | 5 (Ref.) | 6 (Ref.) |
|---|---|---|---|---|---|---|
| Resin component: | | | | | | |
| Araldite ® GY 250 | 80.5 | 80.5 | 80.5 | 80.5 | 80.5 | 80.5 |
| Epikote ® Resin 862 | 80.5 | 80.5 | 80.5 | 80.5 | 80.5 | 80.5 |
| Araldite ® DY-E | 26.1 | 26.1 | 26.1 | 26.1 | 26.1 | 26.1 |
| Modifier DW 1765 BD | 2.3 | 2.3 | 2.3 | 2.3 | 2.3 | 2.3 |
| Curing component: | | | | | | |
| Amine | 1,3-BAC 35.5 | IPDA 42.6 | MXDA 34.0 | TMD 39.6 | TETA 30.0 | D230 60.0 |
| Viscosity (10') [Pa · s] | 0.51 | 0.65 | 0.46 | 0.42 | 0.71 | 0.31 |
| König h. [s] (1d SCC) | 179 | 97 | 207 | 164 | 206 | n.m. |
| [s] (2d SCC) | 227 | 195 | 237 | 206 | 214 | 6 |
| (4d SCC) | 225 | 211 | 225 | 223 | 224 | 98 |
| (7d SCC) | 238 | 231 | 236 | 228 | 234 | 171 |
| (14d SCC) | 239 | 234 | 236 | 231 | 236 | 200 |
| Appearance (SCC) | nice | nice | cloudy | nice | cloudy | nice |
| Q-SUN (72 h) ΔE | 1.9 | 3.5 | 9.9 | 8.4 | 3.0 | 4.7 |
| König h. [s] (7d 8°/80%) | 182 | 139 | 174 | 91 | 167 | 7 |
| [s] (+2d SCC) | 225 | 213 | 213 | 202 | 192 | 150 |
| (+7d SCC) | 231 | 220 | 225 | 218 | 200 | 195 |
| (+14d SCC) | 231 | 227 | 227 | 222 | 207 | 204 |
| Appearance (8°/80%) | nice | matt | cloudy | matt | cloudy, tacky | nice |
| Marks | none | 1x ring | none | 1x ring | none | 3x ring |

"n.m." "stands for not measurable" (still tacky).

TABLE 1

| Example | 7 (Ref.) | 8 (Ref.) | 9 (Ref.) | 10 (Ref.) | 11 (Ref.) | 12 (Ref.) |
|---|---|---|---|---|---|---|
| Resin component: | | | | | | |
| Araldite ® GY 250 | 80.5 | 80.5 | 80.5 | 80.5 | 80.5 | 80.5 |
| Epikote ® Resin 862 | 80.5 | 80.5 | 80.5 | 80.5 | 80.5 | 80.5 |
| Araldite ® DY-E | 26.1 | 26.1 | 26.1 | 26.1 | 26.1 | 26.1 |
| Modifier DW 1765 BD | — | — | — | — | — | — |
| Curing component: | | | | | | |
| Amine | 1,3-BAC 35.5 | IPDA 42.6 | MXDA 34.0 | TMD 39.6 | TETA 30.0 | D230 60.0 |
| Viscosity (10') [Pa · s] | 0.48 | 0.65 | 0.43 | 0.36 | 0.69 | 0.29 |
| König h. [s] (1d SCC) | 25 | 57 | 39 | 36 | 6 | n.m. |
| [s] (2d SCC) | 91 | 105 | 35 | 39 | 6 | 28 |
| (4d SCC) | 92 | 164 | 46 | 41 | 6 | 126 |
| (7d SCC) | 91 | 119 | 36 | 60 | 8 | 112 |
| (14d SCC) | 80 | 190 | 52 | 43 | 25 | 203 |
| Appearance (SCC) | structure | matt | cloudy | structure | structure | nice |
| Q-SUN (72 h) ΔE | 6.0 | 4.6 | 12.9 | 11.6 | 11.9 | 4.6 |
| König h. [s] (7d 8°/80%) | 25 | 28 | 4 | 1 | 10 | 1 |
| [s] (+2d SCC) | 27 | 71 | 8 | 6 | 7 | 3 |
| (+7d SCC) | 17 | 88 | 11 | 11 | 3 | 3 |
| (+14d SCC) | 11 | 77 | 14 | 22 | 6 | 4 |
| Appearance (8°/80%) | structure | matt | cloudy | structure | cloudy, tacky | tacky |
| Marks | 4x slightly white | 4x white | 4x white | 4x ring | 4x white | 4x ring |

Examples 13 to 16

For each example, the ingredients of the resin component indicated in table 2 were mixed in the amounts indicated (in parts by weight) and stored with the exclusion of moisture.

The ingredients of the curing agent component indicated in table 2 were mixed and stored in similar manner.

The two components of each composition were then processed by means of a drill with mixer rod to give a homogeneous liquid and this was tested immediately as follows:

Immediately after the components had been mixed, the viscosity was measured at 23° C. ("Mixed viscosity (23° C.)") on a thermostated Anton Paar plate-plate viscometer (diameter 50 mm, distance 0.5 mm, shear rate 10 s$^{-1}$).

The Shore D hardness was determined on cylindrical test specimens having a thickness of 5 mm after storage under standard climatic conditions for 7 days and 14 days.

The tensile strength and elongation at break were determined by applying the mixed composition in a layer thickness of 2 mm to a silicone plate and storing this under standard climatic conditions. After 1 day, the cured film was detached from the silicone plate, dumbbell-shaped test specimens having a length of 75 mm with a bar length of 30 mm and a bar width of 4 mm were punched out, and the test specimens were tested after a total curing time of 7 days at a strain rate of 2 mm/min in accordance with DIN EN ISO 527-2.

To determine the emission of organic compounds of low volatility in accordance with ISO 16000-25, petri dishes 36 mm in diameter were filled with the mixed composition in a layer thickness of 0.7 mm and stored under standard climatic conditions. After 6 days and after 31 days, the emission was determined in a microchamber at a nitrogen flow of 75 ml/min (corresponding to an air exchange rate of 100/h). For the 6-day values, the compounds detected in the nitrogen stream were quantified by GC/MS; for the 31-day values, this was done by GC/FID. Quantification was by calibration with toluene and benzyl alcohol based on peak area, with all detected compounds except for benzyl alcohol quantified as toluene equivalents and benzyl alcohol as benzyl alcohol equivalents. The results are expressed as the sum of the toluene and benzyl alcohol equivalents and extrapolated to the European reference room.

To determine the impact resistance, sandblasted concrete slabs measuring 300×300×40 mm were coated (2 kg/m$^2$) on the sandblasted surface with 120 g of Sikafloor®-161 (2-component basecoat based on epoxy resin, from Sika)

that was filled with an additional 60 g of quartz sand (grain size 0.1 to 0.4 mm) and these were stored under standard climatic conditions for 24 hours. The mixed composition was applied in a layer thickness of 3 mm to the concrete slabs thus primed and these were stored for 7 days under standard climatic conditions. The impact resistance of this coating was determined in accordance with ISO 6272, with loads of 6, 8, 10, 12, 14, and 16 Nm each applied to the surface five times in different places. The result for the impact resistance was expressed as the maximum load at which at least 4 of the 5 drop tests were executed without visible damage to the coating.

The appearance was assessed on the coated concrete slabs produced for the determination of impact resistance. A surface was described as "nice" if it was even, clear, and glossy without spots or craters.

TABLE 2

Composition and properties of examples 13 to 16.

| Example | 13 | 14 | 15 | 16 |
|---|---|---|---|---|
| Resin comp.: | | | | |
| Araldite ® GY 250 | 56.08 | 54.01 | 50.60 | 47.16 |
| Epikote ® Resin 862 | 14.03 | 13.51 | 12.65 | 11.79 |
| Araldite ® DY-E | 11.36 | 10.94 | 10.26 | 9.55 |
| Modifier DW 1765 BD | 0.92 | 0.89 | 0.84 | 0.78 |
| Defoamer | 1.85 | 1.78 | 1.67 | 1.57 |
| Curing agent comp.: | | | | |
| 1,3-BAC | 12.76 | 12.07 | 11.50 | 10.30 |
| NB-EDA | 3.00 | 2.84 | 2.71 | 2.42 |
| Benzyl alcohol | — | 3.96 | 9.77 | 16.43 |
| Mixed viscosity (23° C.) | 0.29 Pa · s | 0.29 Pa · s | 0.25 Pa · s | 0.15 Pa · s |
| Shore D (after 7 d) | 78 | 74 | 72 | 37 |
| (after 14 d) | 78 | 75 | 73 | 45 |
| Tensile strength [MPa] | 35.6 | n.d. | 34.8 | n.d. |
| Elongation at break [%] | 1.50 | | 3.40 | |
| Emission (after 6 d) | 2164 | 1933 | n.d. | n.d. |
| [µg/m³] (after 31 d) | 459 | 598 | | |
| Impact resistance [Nm] | 6 | n.d. | 14 | n.d. |
| Appearance | nice | n.d. | nice | n.d. |

"n.d." stands for "not determined"

The invention claimed is:

1. An epoxy resin composition comprising:
   at least one liquid epoxy resin including bisphenol A diglycidyl ether and bisphenol F diglycidyl ether, where A represents acetone, and F represents formaldehyde,
   monoglycidyl ethers,
   at least 70% by weight of bis(aminomethyl)cyclohexane based on a total amine content, and
   at least one wax in an amount ranging from 0.1 to less than 2 parts by weight based on 100 parts of epoxy group-containing constituents in the composition, wherein the wax is a paraffin wax dispersed in bisphenol A diglycidyl ether and monoglycidyl ethers, and
   wherein the epoxy resin composition is curable at a low temperature in a range of from 5° C. to 10° C. to produce a coating without blushing-related surface defects.

2. The composition as claimed in claim 1, wherein the composition comprises at least one further constituent selected from reactive diluents containing epoxy groups, further polyamines, accelerators, thinners, and fillers.

3. The composition as claimed in claim 2, wherein the composition includes a content of a thinner benzyl alcohol, in the range from 1% to 15% by weight.

4. The composition as claimed in claim 1, wherein the composition has two or more components and includes
   a resin component that comprises the at least one liquid epoxy resin and optionally further compounds having epoxy groups, and
   a curing agent component that comprises the bis(aminomethyl)cyclohexane and optionally further polyamines or curing agents,
   wherein the at least one wax is present as a constituent of the resin component or of the curing agent component or of both components.

5. A cured composition obtained from curing the epoxy resin composition as claimed in claim 4 after mixing the components.

6. An article obtained from the cured composition as claimed in claim 5.

7. A floor coating which covers a floor and includes the composition as claimed in claim 1.

8. The floor coating as claimed in claim 7, wherein the floor coating is an element of a floor covering comprising
   optionally a basecoat,
   optionally a leveling layer,
   one or more layers of a base layer, which is optionally sprinkled with quartz sand,
   and optionally a seal.

9. The floor coating as claimed in claim 7, wherein the floor coating is a seal.

10. The composition as claimed in claim 1, wherein the composition comprises less than 30% by weight of amine-epoxy adducts, based on the total amine content.

11. The composition as claimed in claim 1, wherein the composition comprises less than 20% by weight of amine-epoxy adducts, based on the total amine content.

12. The composition as claimed in claim 1, wherein the composition comprises less than 10% by weight of amine-epoxy adducts, based on the total amine content.

13. The composition as claimed in claim 1, wherein the composition is curable at the low temperature and 80% humidity to produce the coating without the blushing-related surface defects.

14. The composition as claimed in claim 1, wherein the paraffin wax dispersed in bisphenol A diglycidyl ether and monoglycidyl ethers contains: 40% to 75% by weight of paraffin wax; 10% to 30% by weight of bisphenol A diglycidyl ethers; and 10% to 30% by weight of alkyl glycidyl ethers, based on a total weight of the paraffin wax dispersed in bisphenol A diglycidyl ether and monoglycidyl ethers.

15. The composition as claimed in claim 1, further comprising:
   at least 2% to 30% by weight of n-benzylethane-1,2-diamine based on the total amine content, and
   at least 1 to less than 15 parts by weight of benzyl alcohol based on 100 parts of epoxy group-containing constituents in the composition.

* * * * *